Feb. 23, 1965 P. H. CARTER 3,170,568
HERMETICAL PAPER CONTAINERS, LIDS, AND
METHOD OF PROVIDING SAME
Filed March 7, 1963 2 Sheets-Sheet 1
FIG. 1.
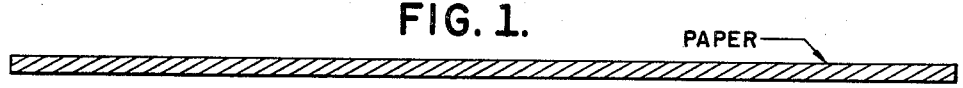
PAPER
FIG. 2.
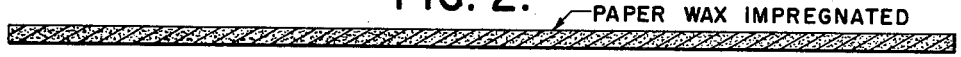
PAPER WAX IMPREGNATED
FIG. 3.
21 PLASTIC COAT
FIG. 4.
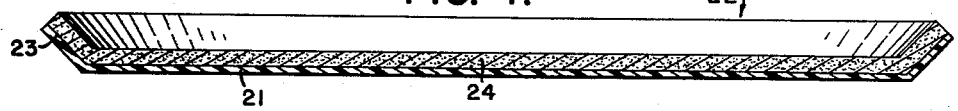
23  21  24  22
FIG. 5.
FIG. 6.
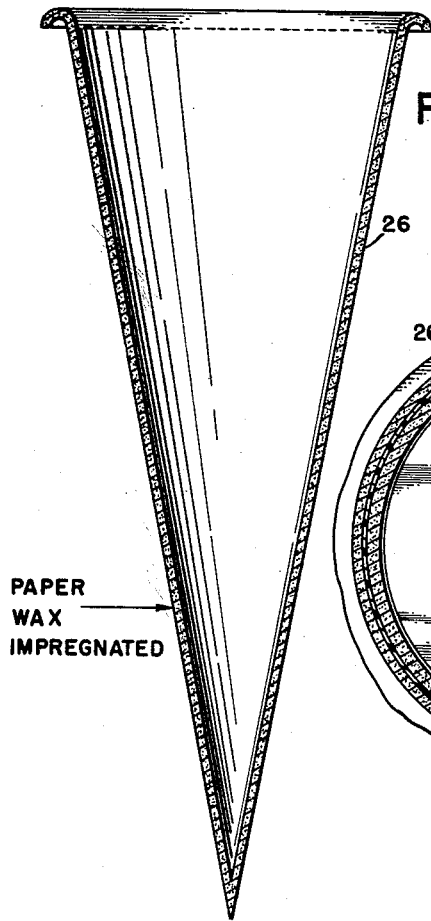
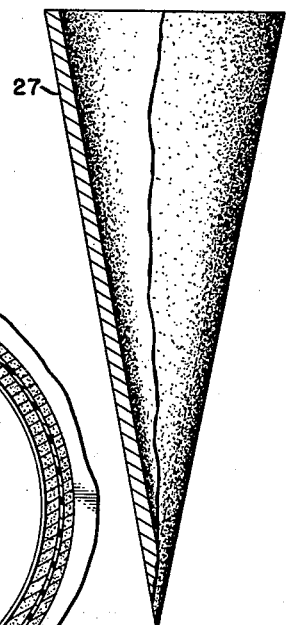
PAPER
WAX
IMPREGNATED
FIG. 8.
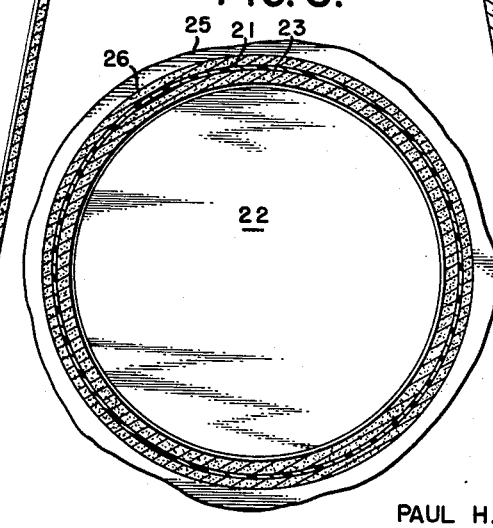
26 25 21 23
22
INVENTOR.
PAUL H. CARTER
BY *Albert J. Kramer*
ATTORNEY Feb. 23, 1965   P. H. CARTER   3,170,568
HERMETICAL PAPER CONTAINERS, LIDS, AND
METHOD OF PROVIDING SAME
Filed March 7, 1963   2 Sheets-Sheet 2
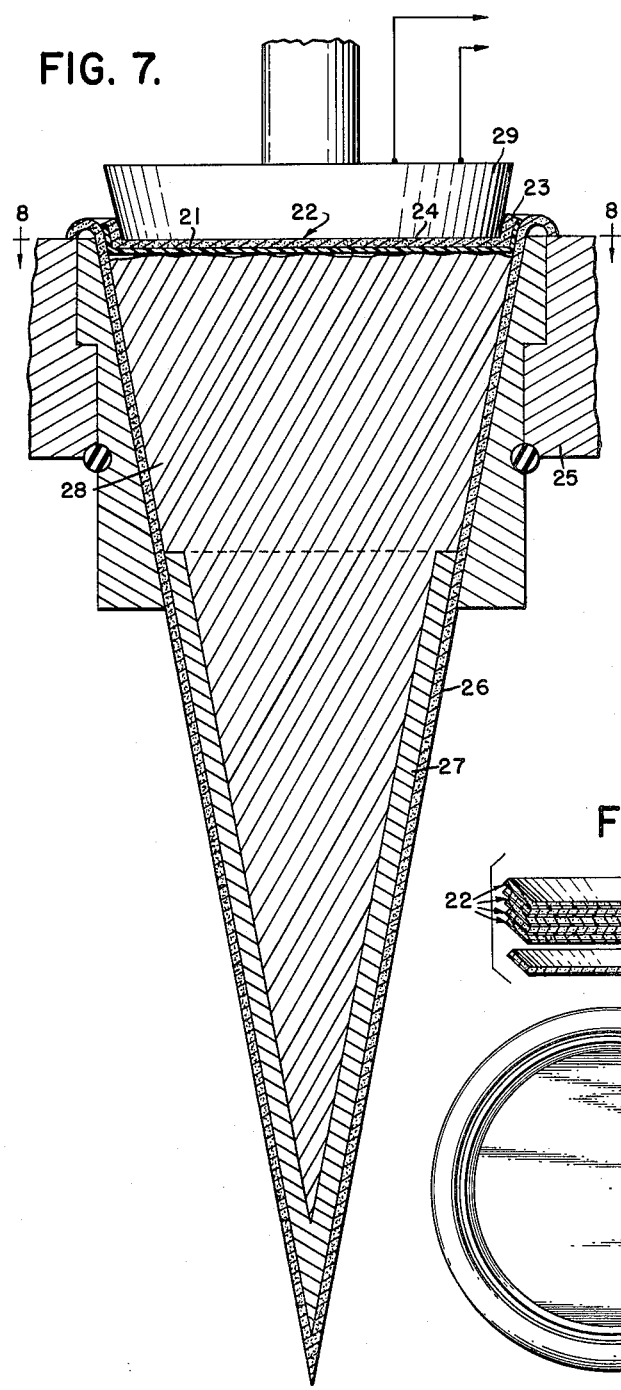
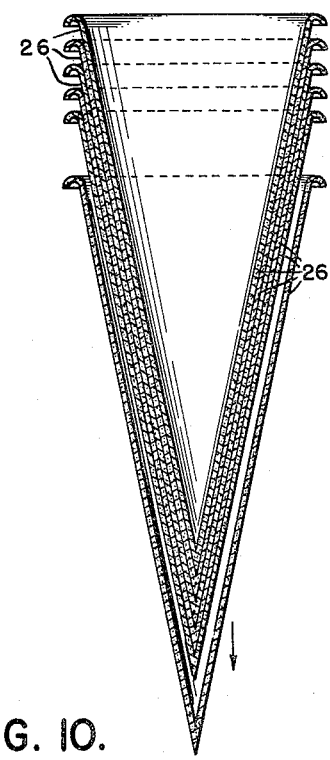
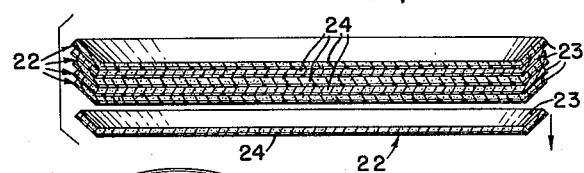
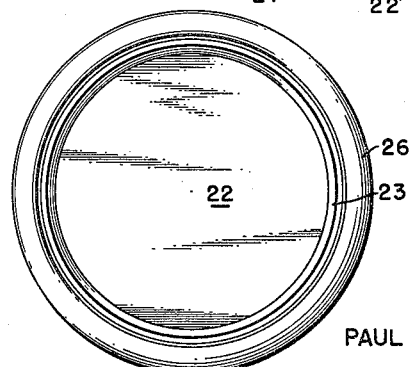
INVENTOR.
PAUL H. CARTER
BY Albert J. Kramer
ATTORNEY United States Patent Office 3,170,568
Patented Feb. 23, 1965

3,170,568
HERMETICAL PAPER CONTAINERS, LIDS, AND
METHOD OF PROVIDING SAME
Paul H. Carter, Baltimore, Md., assignor to Maryland
Cup Corp., Owings Mills, Md., a corporation of
Maryland
Filed Mar. 7, 1963, Ser. No. 263,518
7 Claims. (Cl. 206—46)

This invention relates to hermetical paper containers and to the provision and securing of lids to such containers.

For the purpose of illustrating the invention, it will be described hereinafter in reference to a popular form of novelty ice cream product, by way of convenient example, and not by way of limitation, it being understood that the invention is not so limited but has broad application in the field of packaging products in paper containers.

In recent years there has been developed what is now a popular form of novelty ice cream product consisting of a pastry cone filled with ice cream and packaged in a conical paper jacket that fits closely about the pastry cone. The popularity of these products resides in many factors. It is essentially a prepackaged ice cream cone. It obviates the customary dipping of ice cream from bulk quantities which is not only time consuming, but requires special equipment and personnel to accomplish. It is also difficult, if not impossible, to accomplish under controlled sanitary conditions.

The prepackaged ice cream cone obviates these deficiencies by providing a product that is completely sanitary, uniform in quality and quantity, easy to market from the retailers point of view and, moreover, lends itself to the inclusion in the package of ancillary confectionary items, such as chocolate and other syrups, coatings, chopped nuts, coconut shreds and candy.

These ice cream cone packages, typically, comprise a conical paper jacket into which the ice cream cone is placed and a circular lid sealed to the open end of the filled jacket. Various forms of such lids have heretofore been provided.

There are many factors which must be considered in providing lids or closure members for such jackets. In the first place, the jacket must be made impervious to moisture. These products are normally placed in storage at sub-freezing temperatures to retain the ice cream in a frozen condition. The storage compartments and the temperature conditions thereof are frequently such as to maintain a temperature differential between the freezing elements and the stored products. This sets up a distillation condition between the ice cream and the freezing compartment. Since distillation always proceeds from a relatively warmer area to a relatively colder area, the transfer of sublimed moisture through the walls of a porous paper jacket would take place in the freezing compartment. This has many obvious disadvantages and to prevent it, the paper jacket is made impervious to moisture. It is essential, however, that this be accomplished at a low cost in order to keep the product within marketable price limitations, children constituting the largest consumer group in this respect.

To fit these and other requirements, the most effective and economical method of rendering the paper jackets impervious to moisture under refrigeration is by impregnating them with wax. The wax is applied in hot liquid form which, upon cooling, solidifies to fill and seal the pores of the paper and thus not only fulfills the requirement of inexpensively rendering the paper impervious to moisture, but also acts as a lubricant at the surfaces to permit easy separation of the jackets on being fed to a filling machine from a nested condition.

The lids used are also of paper and are also treated with wax the same way and for the same purposes. The problem is thus presented of sealing the waxed lids to the waxed jackets. If time were not a critical factor, the lids could be placed in position in the open end of the jacket and the contacting surfaces heated to melt the wax, after which the wax could be permitted to cool and solidify. The difficulty with this is the fact that time is a critical factor. The machines, for practical purposes, must yield the products at a rate that does not provide sufficient time to melt the wax and then permit it to harden. Such a method of sealing is, therefore, impractical and this is generally true of any method that depends upon a thermoplastic material as the sealant.

To achieve the sealing speed required, which must be less than a second and even less than half a second for many high speed operations, a thermosetting resin must be employed. There are many thermosetting resins, but unfortunately, they are generally not compatible with wax and cannot be used on waxed surfaces as is required in this case.

I have found however, that a particularly effective thermosetting resin for this purpose is polyvinyl acetate. It has unique properties in this respect that renders it compatible with the wax and permits it to be heat sealed in about ½ to ⅓ of a second at temperatures which during such a brief period does not adversely affect the other parts of the product, including the paper and the wax.

I have also found that the lids when impregnated with the wax and coated on one side with the polyvinyl acetate can be shaped with a sealing flange adapted to lie against the lateral surface of the jacket when placed in position and that such lids with the preshaped flange are quite resilient and retain their true circular form indefinitely during the processing step, whereas such lids cannot be provided with the wax coating alone or with the untreated paper when the paper is made sufficiently thin to prevent rupture of the fibers thereof by the dies used to shape them.

To explain further the invention and the manner in which it may be practiced, there is illustrated in the accompanying drawing various features.

In the drawing:

FIG. 1 is a cross sectional view of a circular untreated blank of paper prior to being treated and formed into a lid in accordance with this invention.

FIG. 2 is the same blank after being treated to impregnate it with wax.

FIG. 3 is a similar view of the same wax treated blank to which there has been applied a coating of polyvinyl acetate.

FIG. 4 is the same wax treated and coated blank after being subjected to a die to shape it into the form of a flanged lid ready to be applied to the container.

FIG. 5 is a vertical sectional view of a wax impregnated paper jacket comprising the container for the ice cream confectionary product.

FIG. 6 is an elevational view of an ordinary ice cream cone, partly broken away, to be placed in the jacket and filled with ice cream prior to sealing of the jacket with a lid.

FIG. 7 is a vertical sectional view of a completed packaged ice cream confectionary product in accordance with this invention during application of the heat sealing iron.

FIG. 8 is a cross sectional view along the line 8—8 of FIG. 7.

FIG. 9 is a top plan view of the completed product.

FIG. 10 is an elevational view showing a stack of the lids in nested form to illustrate the manner in which the lids are fed one at a time from the bottom.

FIG. 11 is an elevational view of a stack of paper jackets showing the manner in which they are fed one at a time therefrom.

Referring with more particularity to the drawing, FIGS. 1 to 4 show sequentially the steps of forming the lid. FIG. 1 illustrates a blank sheet of paper untreated, and hence having a definite porosity. The thickness of the paper is exaggerated in the drawing for illustrative purposes, but is actually thin, like a sheet of conventional writing paper, on the order of 0.006 inch. The surface of porous paper of this kind has a relatively high coefficient of friction and, therefore, such untreated blanks are difficult to feed one at a time from a stack. It is necessary that the paper be thin in order to permit it to be formed in a die, such as that shown in patent application, Ser. No. 63,998, filed October 21, 1960, now abandoned, and also to prevent rupture or cracking during the die forming operation.

The untreated paper, however, is wholly unsuited for the purposes of this invention because of its porosity, coefficient of friction, and inability to hold a set shape to which it must be subjected by the die in order to form the required flanged lid. Accordingly, the paper is treated with wax. This is done in the conventional manner by applying to it hot liquefied wax which fills the pores. The impregnated wax is then permitted to cool and become solidified, thus rendering the paper impervious to moisture. The blank thus treated with wax is shown in FIG. 2, the thickness again being exaggerated for purposes of clarification of the disclosure.

The wax impregnated blank is then further treated by the application of a coating 21 of a thermosetting adhesive on the bottom side or what is to become the inner side of the lid 22, one suitable and unique material for this purpose being polyvinyl acetate. The material in the form of a water emulsion or dissolved in an organic solvent, such as acetone, is spread on the surface of the paper and then permitted to dry. The thickness of the resulting coating should preferably be about 0.005 inch. Polyvinyl acetate is especially unique for this purpose because it is compatible with the waxed surface and can be thermoset in a fraction of a second, typically ⅓ of a second, at a temperature of about 475° F., but temperatures generally in the range of about 300° to 475° F. for about ½ to ⅓ second may be used. Within this range of temperature and time the wax does not have time to melt and adversely effect the adhesive qualities of the material. Polystyrene can also be used as a substitute for polyvinyl acetate and may be applied in the form of an aqueous dispersion.

After the coating is applied, the blank is then subjected to forming molds to provide a flared peripheral flange 23. During this forming operation creases or folds are created in the flange because the diameter is decreased. In order to provide an acceptable lid that will retain its shape and continuously contact the inner surface of the jacket to which it is to be applied, and thus provide a hermetical package, it is necessary to iron the flange smooth. When this is done after the preconditioning of the blank by the wax and polyvinyl acetate, it is found that the flange retains its shape and its angular position relative to the remaining part. The fibers of the paper, it appears, are locked in place and held together by the impregnant and coating which retain the central part 24 of the lid in a flat unwarped condition. This is an essential requirement to the handling of stacks of these lids in the filling machine. When other types of lids are used which are warped and not uniform in shapes, it is substantially impossible to handle them by a machine which is designed to handle a given geometrical shape of lid, e.g. circular.

The lids, thus treated and preformed are placed in stacks (see FIG. 10) and from this stacked condition are dispensed one at a time in a filling machine 25 to the upper complementary ends of the jackets 26 after the ice cream cone 27 and ice cream 28 have been placed therein, whereupon the sealing iron 29 is placed on the lid in contact with the flange for a fraction of a second to heat seal the adhesive to the jacket as shown in FIG. 7.

A modified procedure consists in adding to the hot liquid wax before impregnating the jacket paper, about 30%, by weight, of polyethylene. With this impregnation, a polyethylene coating on the lids can be used to the exclusion of both the wax and the polyvinyl acetate or polystyrene, because it has the property of being heat sealable to the wax-polyethylene mixture, as well as the property of sealing the pores of the paper and holding the shape of the lid after molding.

Having thus described my invention, I claim:

1. A hermetical paper container comprising a filled body section of wax impregnated paper having an annular open end adapted to receive a lid, a wax impregnated lid disposed in said open end, said lid having an annular flange adjacent to and in continuous contact with an annular surface portion of said body section, and a thermoset adhesive securing the flange to the body section.

2. A hermetical paper container comprising a filled body section of wax impregnated paper having an annular open end adapted to receive a lid, a wax impregnated lid disposed in said open end, said lid having an annular flange adjacent to and in continuous contact with an annular surface portion of said body section, and a layer of a thermoset adhesive selected from the group consisting of polyvinyl acetate and polystyrene, securing the flange to the body section.

3. A lid for a wax impregnated paper container comprising a wax impregnated blank of paper having an annular peripheral flange, one surface of the flange being adapted to contact and be secured to the container along a continuous area, said flange surface having a coating of a thermosettable adhesive.

4. A lid as defined by claim 3 in which the adhesive is selected from the group consisting of polyvinyl acetate and polystyrene.

5. A lid as defined by claim 3 in which the adhesive is polyvinyl acetate.

6. A sealed container comprising a filled body section of paper impregnated with a mixture of wax and polyethylene, said body section having an open end adapted to receive a closure lid, said open end having an annular surface, a closure lid in said open end having an annular flange adjacent to and in continuous contact with said annular surface and a thermoset layer of polyethylene between and in sealing engagement with said surface and flange.

7. A sealed container comprising a filled conical body section of paper impregnated with a mixture of wax and polyethylene, said body section having its larger end open to receive a closure lid, a closure lid in said larger end, said lid having an annular flange adjacent to and in continuous contact with an annular inner surface portion of said larger end, and a thermoset layer of polyethylene between and in sealing engagement with said annular surface and flange.

References Cited by the Examiner
UNITED STATES PATENTS

| | | | |
|---|---|---|---|
| 1,850,493 | 3/32 | Brewer | 93—1.3 |
| 2,595,046 | 4/52 | Amberg | 93—1.3 |
| 2,746,669 | 5/56 | Moore | 229—43 |
| 2,787,410 | 4/57 | Moore | 229—43 |
| 2,965,499 | 12/60 | Wise. | |
| 2,966,292 | 12/60 | Saidel | 229—1.5 |
| 3,079,057 | 2/63 | Colarusso. | |

FRANKLIN T. GARRETT, *Primary Examiner.*

GEORGE O. RALSTON, *Examiner.*